United States Patent [19]

Shinnar et al.

[11] 3,970,587
[45] July 20, 1976

[54] COMBUSTION REGENERATION OF HYDROCARBON CONVERSION CATALYST WITH RECYCLE OF HIGH TEMPERATURE REGENERATED CATALYST

[75] Inventors: Reuel Shinnar, Great Neck, N.Y.; Paul W. Snyder, Jr., Pitman; Vern W. Weekman, Jr., Cherry Hill, both of N.J.

[73] Assignee: Mobil Oil Corporation, New York, N.Y.

[22] Filed: July 18, 1973

[21] Appl. No.: 380,172

[52] U.S. Cl. .............................. 252/417; 23/288 B; 23/288 S; 208/120; 208/164
[51] Int. Cl.² .................... B01J 29/38; B01J 37/14; C10G 11/18
[58] Field of Search ............ 252/417; 208/120, 164; 23/288 B, 288 S

[56] References Cited
UNITED STATES PATENTS

| | | | |
|---|---|---|---|
| 2,451,619 | 10/1948 | Hengstebeck et al. ............. | 252/417 |
| 2,487,132 | 11/1949 | Hemminger..................... | 208/120 |
| 2,494,614 | 1/1950 | Grote................................ | 23/288 S |
| 2,581,670 | 1/1952 | Kassel.............................. | 252/417 |
| 2,619,473 | 11/1952 | Wurth et al....................... | 252/417 |
| 2,758,068 | 8/1956 | Howard............................ | 252/417 |
| 2,902,432 | 9/1959 | Codet et al. ..................... | 252/417 |
| 3,351,548 | 11/1967 | Payne et al. ..................... | 208/120 |
| 3,563,911 | 2/1971 | Pfeiffer et al. ................... | 252/417 |
| 3,661,799 | 5/1972 | Cartmell .......................... | 208/164 |
| 3,661,800 | 5/1972 | Pfeiffer et al. ................... | 252/417 |
| 3,821,103 | 6/1974 | Owen et al....................... | 252/417 |
| 3,838,036 | 9/1974 | Stine et al........................ | 252/417 |
| 3,843,330 | 10/1974 | Conner et al. ................... | 252/417 |
| 3,844,973 | 10/1974 | Stine et al........................ | 252/417 |
| 3,893,812 | 7/1975 | Conner et al. ................... | 23/288 B |
| 3,909,392 | 9/1975 | Horecky, Jr. et al............. | 208/120 |
| 3,926,778 | 12/1975 | Owen et al....................... | 252/417 |

FOREIGN PATENTS OR APPLICATIONS 2,256,276  6/1973  Germany ........................... 252/417

Primary Examiner—Winston A. Douglas
Assistant Examiner—P. E. Konopka
Attorney, Agent, or Firm—Charles A. Huggett; Carl D. Farnsworth

[57] ABSTRACT

A fluid catalytic cracking - catalyst regeneration system is described wherein regeneration of a crystalline zeolite hydrocarbon conversion catalyst is accomplished at an elevated temperature in the presence of regenerated catalyst mixed therewith in the upper portion of a bed of regenerated catalyst with the mix ratio controlled as a function of the amount of primary regeneration gas introduced to a lower portion of the bed of regenerated catalyst.

6 Claims, 1 Drawing Figure

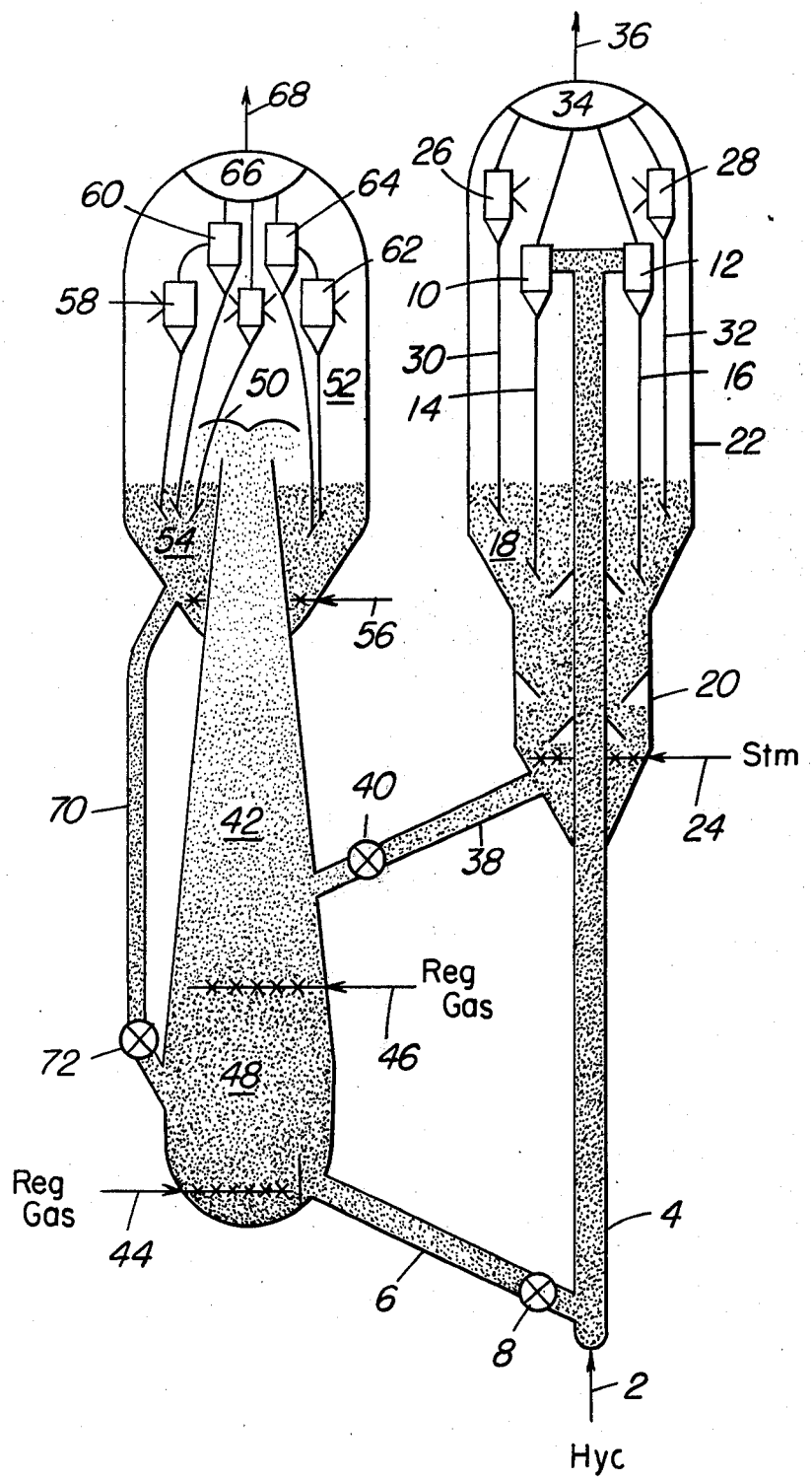

COMBUSTION REGENERATION OF HYDROCARBON CONVERSION CATALYST WITH RECYCLE OF HIGH TEMPERATURE REGENERATED CATALYST

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with the technique of regenerating a hydrocarbon conversion catalyst containing deactivating deposits of carbonaceous material.

SUMMARY OF THE INVENTION

The present invention is concerned with the regeneration of finely divided catalyst solids of a fluidizable particle size which become deactivated or rendered substantially useless for further hydrocarbon conversion reactions by the deposition of combustible material thereon such as hydrocarbonaceous material hereinafter referred to as carbonaceous material or coke. In a particular aspect the present invention is concerned with an improved multi-stage catalyst regeneration operation or system arranged and operated to improve upon the recovery of heat available through the combustion of carbonaceous material. In a more particular aspect the regeneration technique of the present invention relies upon an interrelationship of operating parameters comprising recycle of high temperature regenerated catalyst in ratios promoting coke combustion in combination with direct heat exchange in a dense catalyst phase and in a more dispersed catalyst phase under conditions promoting the combustion of carbonaceous material and products thereof to carbon dioxide rich flue gases. Thus, the arrangement of an upflowing less dense or dispersed suspended catalyst phase above a more dense phase of regenerated catalyst and the introduction of coke contaminated catalyst in an intermediate region above the most dense catalyst phase is designed to substantially influence the elevated temperature combustion of carbonaceous deposits before contaminated catalyst particles pass to the most dense catalyst phase region and promote the recovery of heat by the burning of carbonaceous material and carbon monoxide in the dispersed catalyst phase.

The regeneration technique and system of the present invention is particularly useful in the regeneration of low coke producing crystalline aluminosilicate hydrocarbon conversion catalysts. In one aspect the regeneration technique of this invention relies upon the mixing of hot regenerated catalyst particles with contaminated catalyst particles containing carbonaceous deposits controlled by regeneration gas velocity and catalyst inventory in the regeneration vessel to provide at least a 1:1 ratio thereof. The combination forms an upflowing fluid phase or mass of catalyst at a mixed temperature of at least about 1000°F. and preferably at least 1200°F. The removal of deposited carbonaceous material from the catalyst is thereafter rapidly initiated and accomplished with the oxygen containing regeneration gas introduced thereto thereby heating the catalyst to an elevated temperature of at least about 1250°F. and as high as about 1400°F. during transfer of the formed catalyst mixture upwardly through the dispersed or expanded catalyst phase in an elongated regeneration zone.

In the apparatus arrangement of the present invention, primary oxygen containing regeneration gas is added to an upper portion of a dense fluid bed of regenerated catalyst particles in a region of expanded particle density wherein mixing occurs between contaminated catalyst particles and high temperature regenerated catalyst particles. Secondary oxygen containing regeneration gas usually in a lesser amount but sufficient to maintain the regenerated catalyst in a dense fluid bed condition is introduced to a bottom portion of the dense fluid bed of regenerated catalyst existing at an elevated temperature of at least 1250°F. The amount of oxygen containing gas introduced to the fluid bed of regenerated catalyst and particularly that introduced to the upper portion of the fluid bed of catalyst may be varied to adjust dispersion density of the catalyst mixture in the upflowing expanded catalyst regeneration phase. Thus, initial regeneration of catalyst for the removal of deposited carbonaceous material occurs at an elevated temperature in a region or zone intermediate a relatively dense catalyst phase of regenerated catalyst superimposed by a more dilute catalyst phase and conversion of formed carbon monoxide is encouraged by the initial high temperature catalyst mixture and excess oxygen containing regeneration gas provided in the high temperature suspension comprising the upflowing dispersed catalyst regeneration phase. Conversion of formed carbon monoxide to carbon dioxide in the upflowing mass of catalyst particles at a density of particles not less than 2 to 5 lbs per cu.ft. provides additional heat readily absorbed by the upflowing mass of catalyst particles thereby further heating the catalyst to an elevated temperature before separation thereof from combustion flue gases by the combination of gravity separation and by cyclonic means. The hot regenerated catalyst thus obtained and separated from combustion flue gases is collected as a dense bed of regenerated catalyst and withdrawn therefrom through a confined zone such as a standpipe for passage to a lower portion of the regeneration apparatus and particularly to the lower portion of a second dense fluid bed of regenerated catalyst maintained in the lower portion of the regeneration vessel. Regenerated catalyst particles are withdrawn from a bottom portion of the second dense fluid catalyst bed but usually from above the secondary regeneration gas inlet distribution means and transferred by suitable conduit means to a hydrocarbon conversion zone wherein the regenerated catalyst is combined with a hydrocarbon feed such as a gas oil to be converted.

Significant features of the regeneration technique of the present invention are concerned with a substantial removal of carbonaceous deposits from the catalyst particles in a dispersed phase of particles providing a density of particles less than about 40 lbs. per cu.ft. and more usually in the range of about 20 to about 30 lbs. per cu.ft. by introducing primary oxygen containing regeneration gas in an upper portion of said second dense fluid bed of regenerated catalyst. Regenerated catalyst particles are caused to flow from the most dense phase region of catalyst particles upwardly through regions of generally decreasing catalyst particle density varying in the range of from about 20 down to about 2 or 5 lbs/cu.ft. before separation of the catalyst particles from regeneration combustion flue gases is effected. The removal of coke or carbonaceous deposits from the catalyst and the conversion of carbon monoxide formed to carbon dioxide is thus particularly accomplished in regions of catalyst particle density varying from about 20 or 30 lbs. per cu.ft. down to about 2 to 5 lbs. per cu.ft. as the mixture of regenerated and contaminated catalyst particles move as a fluid mass of catalyst particles upwardly through a dispersed catalyst phase regeneration zone of changing velocity. In this arrangement the catalyst particles may be heated to an elevated temperature in the range of from about 1200° to about 1400°F. before separation thereof from carbon dioxide rich flue gases. Linear gas velocities of the order of about 8 to 15 feet per second are appropriate for obtaining the density of particles in the dispersed phase above identified. Secondary regeneration gas velocities in the range of 5–10 feet/ second may be used in the most dense phase region of the second bed of regenerated catalyst. Thus under such operating conditions there usually will be no sharp line of demarcation between the more dense phase of catalyst particles and the less dense phase of catalyst particles in the upflowing catalyst regeneration zone.

As indicated hereinbefore, an essential feature of the regeneration procedure of the present invention is directed to the method and technique of rapidly raising the temperature of the spent catalyst containing carbonaceous deposits up to a relatively high initial regeneration temperature by mixing hot regenerated catalyst particles therewith in an amount controlled by the primary regeneration gas stream introduced to the bed of catalyst. Thus, as provided above, the particular arrangement of the present invention relies upon maintaining a relatively dense second fluid bed of regenerated catalyst particles in a lower portion of a regeneration vessel from which regenerated catalyst particles are carried overhead by primary and secondary gas streams of oxygen containing regeneration gas introduced to lower and upper portions of the second bed of catalyst thereby heating regeneration gas introduced to the lower portion of the bed to an elevated regeneration temperature. The primary stream of regeneration gas is introduced to an upper portion of the second dense fluid bed of catalyst and below the inlet for the coke or carbonaceous material contaminated catalyst particles. The catalyst containing contaminating amounts of carbonaceous material is therefore introduced to an upper expanded portion of the second fluid bed of catalyst wherein it is mixed with the hot regenerated catalyst particles in an amount providing a mixed catalyst temperature of at least about 1200°F. to accelerate ignition and burning of deposited carbonaceous material. The catalyst mixture thus formed is caused to move upwardly through the regeneration zone under usually increasing velocity conditions as a function of the primary regeneration gas stream and riser cross section in a dispersed or suspended catalyst phase condition under elevated temperature catalyst regeneration conditions promoting the substantial conversion of carbonaceous deposits and a high conversion to carbon dioxide. It is desirable to at least reduce the coke on the regenerated catalyst to within the range of 0.03 to 0.05 wt.% coke. It is readily apparent from the above discussion that the density of catalyst particles in gasiform material providing velocities in the range of 8 to 15 ft/sec. pass through zones of decreasing density of catalyst particle in the range of about 35 or 30 down to 2 lbs. per cu.ft. during regeneration and heating of the catalyst to a temperature within the range of 1250°F. up to 1400°F. Under some conditions it is contemplated using regeneration temperature conditions as high as about 1450° or 1500°F. In general, the amounts of air and spent catalyst are not independent variables since only a small excess of air above that required to burn carbon to $CO_2$ is desirable. However, with a given amount of air per hour, the linear rate can be adjusted to the desired value by varying the diameter of the riser and the gas residence time can be adjusted to give 1 to 10 seconds by adjusting the height of the riser.

Operating parameters can vary within ranges in application of this invention. The linear gas flow rate in the dispersed phase region between the point of spent catalyst addition and the catalyst disengaging point is above 5 ft/sec., preferably above 8 ft/sec. and more preferably 10 to 15 ft/sec. The density of the catalyst gas mixture entering the disengaging space is 2 lb/cu.ft. or greater, preferably 2–10 lb/cu.ft. and more preferably 2–5 lb/cu.ft. The length of this reaction zone from spent catalyst inlet to disengaging space is sufficient to give a gas residence time preferably of 1 to 10 sec. and more preferably of 3 to 10 sec. The mixture of spent and regenerated catalyst immediately after mixing has a temperature of > 1000°F., preferably > 1200°F., and more preferably > 1250°F. The weight ratio of recycle to spent catalyst in this mixture is greater than about 1, preferably 1 to 5. The density of the catalyst mixture at the point immediately after spent catalyst addition is in the range of 10 to 30 lb/cu.ft., preferably 10–20 lb/cu.ft. In the application of this invention primary oxygen-containing regeneration gas is usually in much larger volume than the secondary gas stream.

BRIEF DESCRIPTION OF THE DRAWING

The drawing shows diagrammatically in elevation an arrangement of apparatus for effecting hydrocarbon conversion and regeneration of catalyst used in the hydrocarbon conversion step in a dispersed-suspended catalyst phase regeneration zone initiated at an elevated temperature by mixing hot regenerated catalyst with coked catalyst and dispersing it in oxygen containing regeneration gas.

DISCUSSION OF A SPECIFIC EMBODIMENT

Referring now to the drawing, there is shown diagrammatically in elevation a side-by-side arrangement of apparatus for effecting conversion of hydrocarbons in a riser conversion zone, stripping of catalyst particles in a downflow catalyst stripping zone and conduit means for passing stripped catalyst to regeneration apparatus diagrammatically depicted for accomplishing the regeneration technique of the present invention. In the arrangement of the drawing a hydrocarbon feed such as a gas oil boiling range feed and boiling in the range of from about 650°F. up to about 1000°F. is introduced by conduit 2 to the bottom portion of riser reactor 4 for admixture with regenerated catalyst introduced thereto by conduit 6 provided with flow control valve 8. A catalyst oil suspension is formed in the bottom portion of the riser in a catalyst to oil ratio providing a hydrocarbon conversion temperature selected from within the range of about 950°F. up to about 1200°F. More usually, a high hydrocarbon conversion temperature in the range of 1000°F. up to about 1100°F. is employed. The suspension formed in the bottom portion of the riser is passed upwardly through the elongated confined riser conversion zone 4 under conditions selected to provide a hydrocarbon residence time within the range of 1 second up to about 10 seconds but more usually in the range of 2 to 8 seconds before discharge of the suspension and separation thereof. Catalyst particles are separated from suspension hydrocarbon vapors by cyclonic means in separator means 10 and 12 positioned at the discharge end of riser 4. The separated catalyst is passed by diplegs 14 and 16 respectively into a downwardly moving dense fluid bed of catalyst particles 18 retained in vessel 22. The fluid bed of catalyst particles 18 moves generally downwardly through a stripping zone 20 in the bottom portion of vessel 22 which is provided with a plurality of downwardly sloping, vertically displaced donut shaped baffle means to provide a tortuous path which will facilitate the stripping of volatile hydrocarbons from the catalyst with stripping gas such as steam introduced to the bottom portion of the stripping zone by conduit 24. Stripping gas, stripped hydrocarbon material and any entrained catalyst fines are carried overhead from fluid bed 18 into a plurality of cyclone separators 26 and 28 provided with catalyst diplegs 30 and 32. Catalyst fines separated in cyclones 26 and 28 are returned by the diplegs to fluid bed 18. Hydrocarbon conversion products and stripping gas pass into plenum chamber 34 from the cyclonic separation means above discussed, from which they are removed by conduit 36 and conveyed to a product fractionation system not shown for separation of the hydrocarbon conversion products into desired fractions.

The catalyst circulated in the system of the drawing and used for converting hydrocarbons to lower and higher boiling products becomes deactivated by the deposition of carbonaceous material. Such carbonaceous material is often referred to as coke. The coke deactivated catalyst from which entrained hydrocarbon vapors have been removed by stripping is removed from the stripping zone 20 by transfer conduit 38 provided with flow control valve 40 for transfer to the catalyst regeneration system of this invention.

The present invention is particularly concerned with the method, system and/or technique for regenerating catalyst containing deactivating amounts of carbonaceous material or coke. More particularly, the present invention is concerned with the method and system for rapidly regenerating relatively low coke producing crystalline aluminosilicate hydrocarbon conversion catalyst in a more efficient heat recovery system than that previously obtained with amorphous type of silica alumina hydrocarbon conversion catalyst. Accordingly, the deactivated crystalline aluminosilicate hydrocarbon conversion catalyst recovered from the hydrocarbon conversion operation with deposited coke or carbonaceous material and transferred by conduit 38 to the regeneration vessel is combined upon discharge into the regeneration vessel with hot regenerated catalyst particles in an amount to provide a catalyst mixture at an elevated temperature of at least 1000°F. and preferably at least about 1200°F. whereby burning of carbonaceous material on the catalyst in the presence of oxygen containing gas supplied as herein provided is rapidly initiated. In forming the initial mixture of deactivated and regenerated catalyst particles it is important to use a high ratio of regenerated catalyst to contaminated catalyst to optimize the regenerator temperature profile for high temperature coke burning in conjunction with sufficient excess oxygen as required to implement the conversion of carbonaceous deposits to particularly carbon dioxide. The catalyst mixture comprising deactivated and regenerated catalyst particles is caused to flow as a function of the volume of regeneration gas introduced to the system upwardly through regions of catalyst particle reactivation and heating by the oxygen-containing regeneration gases which will remove substantially all of the carbonaceous deposits by burning and convert formed carbon monoxide to carbon dioxide. In this upflowing state of catalyst reactivation or regeneration, the mass of catalyst particles pass through regions or zones of ever decreasing particle density restricted preferably to not less than 2 to 5 lbs/cu.ft. wherein the generation of combustion heat and absorption thereof by the catalyst particles is particularly promoted. Thus, in the specific arrangement of the drawing the catalyst mixture formed above regeneration gas inlet 46 is caused to flow upwardly through the regeneration zone 42 by the primary regeneration gas stream introduced by conduit 46 for discharge from the upper end thereof into an enlarged catalyst separation and collecting zone. The density of the catalyst in this zone is controlled both by the primary gas rate and by the riser regenerator shape. The catalyst inventory in the regeneration vessel 42/48 is maintained by the control valve 72 and catalyst make up added through conduit 38. In the arrangement of the drawing, regeneration zone 42 is shown as decreasing in cross-sectional area in the direction of catalyst flow upwardly therethrough. It is to be understood, however, that the regeneration zone may be essentially cylindrical throughout its vertical height rather than tapered as shown. The lower portion of the regeneration zone 42 contains a relatively dense fluid bed of regenerated catalyst into which primary and secondary regeneration gas is introduced by conduit 46 and by conduit 44 respectively. Thus, the catalyst particle bed density of bed 48 may vary from about 30 or 40 lbs. per cu.ft. in a bottom portion thereof down to about 15 or 20 lbs. per cu.ft. above regeneration gas inlet provided by conduit 46. Also the density of catalyst particles in upflowing gases will decrease so that in an upper portion of the regeneration zone adjacent the discharge end thereof the density of particles in gaseous material may be in the range of about 2 to about 5 lbs. per cu.ft. The removal of coke deposits from the catalyst may occur in substantially any part of the regeneration system but normally the removal of coke deposits will occur in the fluid bed of catalyst and in the dispersed catalyst phase above the fluid bed of catalyst. The catalyst suspension passed upwardly through dispersed phase regeneration zone 42 is subjected to elevated temperature catalyst regeneration at a temperature above 1200°F. wherein formed carbon monoxide is converted to carbon dioxide and the catalyst temperature is elevated to a temperature in the range of 1300° to about 1400°F. The upflowing suspension is discharged from the upper open end of the riser regenerator against a deflecting baffle 50 and deflected generally outwardly into an enlarged zone 52 which promotes the settling out of catalyst particles from the upflowing flue gases by virtue of a considerable drop in suspension velocity conditions. Thus, the catalyst particles separate initially from regeneration flue gases by gravity due to a reduction in gas velocity and then catalyst fines are separated from flue gases by cyclonic means 58, 60, 62 and 64 positioned in the upper portion of settling zone 52 comprising the upper portion of the regeneration vessel. The separated catalyst is collected in the lower portion of zone 52 as an annular fluid bed of catalyst 54 about the upper end of the regeneration zone 42. The collected hot regenerated catalyst is maintained in a fluid condition by fluidizing gaseous material introduced by conduit 56 to a lower portion thereof. The fluidizing gas may be any suitable inert gaseous material. Cyclonic separation means 58, 60, 62 and 64 positioned in the upper portion of settling zone 52 separate combustion flue gases from entrained catalyst particles not separated by gravity and the thus separated catalyst particles are passed to fluid catalyst bed 54 by suitable diplegs. Combustion flue gases separated from the catalyst fines and fluidizing gas pass overhead into a plenum chamber 66 from which the flue gases are withdrawn by conduit 68. The hot regenerated catalyst comprising bed 54 existing at an elevated temperature in the range of 1300° to 1400°F. is then conveyed by a standpipe 70 provided with flow control valve 72 for discharge into the lower portion of catalyst bed 48 and above regeneration gas inlet conduit 44. Regenerated catalyst is withdrawn from a lower portion of bed 48 by conduit 6 and transferred to riser reactor 4, as discussed hereinbefore.

As indicated hereinbefore, regeneration zone 42 may be cylindrical in an upper portion thereof rather than tapered, as shown in the drawing. It is also contemplated employing a cylindrical vessel throughout the major portion of its height which is approximately 15 ft. in diameter and about 40 ft. high to accomplish burning about 50,000 lbs/hr. of coke by the regeneration technique as described hereinbefore. In such an arrangement the upper portion of the cylindrical vessel may project into the bottom portion of an enlarged vessel similar to that shown in the drawing and provided with suitable combustion gas - catalyst particles separation means about the open upper end of the cylindrical vessel.

Having thus generally described the method and means for regenerating catalyst particles and discussed a specific embodiment going to the very essence thereof it is to be understood that no undue restrictions are to be imposed thereby except as defined in the following claims.

We claim:

1. A method for regenerating a hydrocarbon conversion catalyst to remove deposited carbonaceous material which comprises, maintaining a first dense fluid bed of regenerated catalyst in the lower portion of an elongated regeneration zone, introducing a first oxygen containing regeneration gas stream to an upper portion of said first fluid bed of catalyst and introducing a second oxygen containing regeneration gas stream to a lower bottom portion of said first fluid bed of catalyst, causing catalyst particles to move continuously upwardly through said first fluid bed into a less dense fluid phase of suspended catalyst particles in regeneration gas traversing an upflow catalyst regeneration zone, wherein the density of suspended catalyst decreases in the direction of flow, introducing spent catalyst particles with carbonaceous deposits into an upper portion of said first fluid bed of upflowing regenerated catalyst particles above said first oxygen containing gas stream in a ratio of spent catalyst with deposited carbon to regenerated catalyst providing a mix temperature of at least 1200°F., separating catalyst particles from regeneration flue gases after traverse of said less dense upflow catalyst regeneration zone and collecting the separated catalyst as a second separate dense fluid bed of regenerated catalyst above said first bed of catalyst, passing regenerated catalyst from said second catalyst bed to a lower portion of said first bed of catalyst above said second regeneration gas stream and below said first regeneration gas stream and withdrawing regenerated catalyst from a lower portion of said first bed for hydrocarbon conversion.

2. The method of claim 1 wherein the amount of regenerated catalyst mixed with spent catalyst contaminated with carbonaceous deposits is controlled as a function of the volume of regeneration gas passed to said first bed of regenerated catalyst.

3. The method of claim 1 wherein the density of particles suspended in regeneration gases passed upwardly through said regeneration zone decreases in the direction of regeneration gas flow from about 40 lbs/cu.ft. to about 3 lbs/cu.ft.

4. The method of claim 1 wherein sufficient oxygen containing regeneration gas is combined with the upflowing suspension of contaminated and regenerated catalyst to assure the conversion of CO to $CO_2$.

5. The method of claim 1 wherein regenerated catalyst is separated from combustion flue gases by the combination of reduced velocity hindered settling and by cyclonic separation.

6. The method of claim 1 wherein regenerated catalyst is at a temperature in the range of 1300° to 1400°F.

* * * * *